Dec. 15, 1970
H. A. CHENEY ETAL  3,547,495
METHOD FOR MAKING SULFUR-OIL SLURRY FOR PIPELINE TRANSPORTATION
Filed Dec. 18, 1968
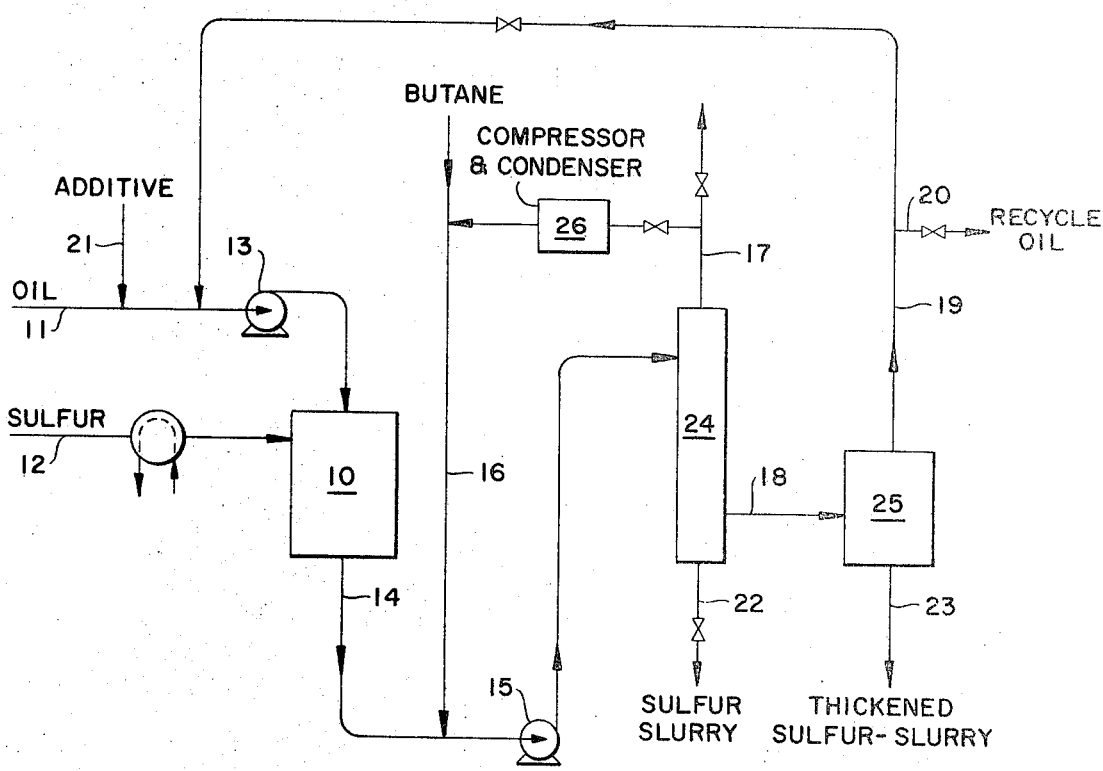
INVENTORS:
H. A. CHENEY
R. K. JUNE
C. J. KUHRE
BY: Yvonne M Pritzker
THEIR AGENT

United States Patent Office
3,547,495
Patented Dec. 15, 1970

3,547,495
METHOD FOR MAKING SULFUR-OIL SLURRY FOR PIPELINE TRANSPORTATION
Harry A. Cheney, Berkeley, Ronald K. June, Pleasant Hill, and Calvin J. Kuhre, Kensington, Calif., assignors to Shell Oil Company, New York, N.Y., a corporation of Delaware
Filed Dec. 18, 1968, Ser. No. 784,727
Int. Cl. B65g 53/30
U.S. Cl. 302—66                                    7 Claims

ABSTRACT OF THE DISCLOSURE

An improved method of making sulfur-oil slurries for pipeline transportation by evaporative cooling of said slurries prior to introducing said slurries in the pipeline.

---

The present invention relates to an improved method of making sulfur-oil slurries for pipeline transportation by cooling said slurries prior to injecting said slurries into a pipeline by evaporative cooling with a volatile low-molecular weight hydrocarbon such as an aliphatic hydrocarbon having less than 6 carbon atoms.

BACKGROUND OF THE INVENTION

The transportation of sulfur neat or as a water or oil slurry in pipelines is well known in the art as noted by reference to U.S. Pat. 2,798,772; 2,917,345 or 2,947,578 or as described in Pipeline Industry, June 1967, pages 58–60. In making the sulfur into a sulfur-hydrocarbon slurry, the sulfur is generally sprayed in molten form into either water or a hydrocarbon to form a slurry suitable for transportation through a pipeline. Formation of a stable slurry wherein the sulfur does not undergo any undesirable change or the slurry does not exhibit a tendency to wide variation in viscosity is essential to the process in addition to other problems which may be encountered during and after transportation of the slurry through a pipeline. Thus, agglomeration and separation of the sulfur from the carrier fluid, plating, depositing or coating of the sulfur on pipeline walls causing plugging of the pipeline, corrosion, viscosity changes due to pressure and temperature variation requiring greater pumping power which increases operation costs, etc., are only a few of the problems normally encountered in making sulfur-liquid hydrocarbon slurries for transportation through pipelines.

Although the above are serious problems for consideration in transporting sulfur through pipelines, nevertheless the transportation of sulfur in slurry form through pipelines can be made to be an effective, attractive and economic means of sulfur transportation, particularly since sulfur is recovered or obtained from isolated, remote and inaccessible areas, and must be transported to desired accessible areas. As noted above, a number of methods have been proposed for making sulfur slurries for pipeline transportation such as by injecting molten sulfur into water or a liquid hydrocarbon thereby forming a sulfur slurry and thereafter injecting the slurry into a pipeline for transportation to a terminal station. Known methods for making sulfur slurries suitable for transporting through pipelines generally do not overcome agglomeration, deposition, sticking, coating and/or plugging problems described above. Also, it is essential that in order to avoid the sticking of sulfur to pipeline walls and plugging of the pipeline, that the slurry when injected into the pipeline be at a temperature of below 150° F. and preferably around 120° F. or lower. Since the molten sulfur is generally at around 240° F. to 300° F. or higher for injection into a hydrocarbon carrier, the slurry formed is substantially above the temperature required for pipeline injection and therefore must be cooled preferably to at least 120° F. Therefore, slurrying sulfur in oil and cooling it effectively and economically for pipeline injection and transportation is an essential feature of the technology of sulfur-oil slurry making and cooling. Conventional cooling such as allowing the slurry to cool on standing is time consuming and costly and other means such as surface heat exchange is also costly and prone to fouling and plugging.

An object of the present invention is to prepare sulfur-liquid hydrocarbon slurries suitable for pipeline transportation.

Still another object of the present invention is to prepare sulfur-liquid hydrocarbon slurries which are resistant to agglomeration, deposition, sticking and plugging of equipment used in its manufacture and pipelines transporting said slurries to a terminal station.

Still another object of this invention is to prepare a sulfur-oil slurry in which the sulfur particles are essentially in spherical form and are resistant to attrition, separation and deposition and sticking to metal surfaces.

Still another object of the present invention is to prepare a sulfur-oil slurry for pipeline transportation such that it can be pumped at reduced pumping costs and requires a minimum of handling and is readily separated from the oil phase at the terminal end of the line.

Still another object of the present invention is to effectively cool sulfur-oil slurries to a temperature range suitable for injection into pipelines for transportation of the slurries to terminal stations.

Other objects will be apparent from the following description.

SUMMARY OF THE INVENTION

It has now been discovered that sulfur-liquid hydrocarbon slurries for pipeline transportation can be effectively cooled and maintained below about 150° F. and preferably around 120° F. or lower and made so that the sulfur is dispersed in the liquid hydrocarbon carrier in a stable form resistant to agglomeration, sticking and attrition, by injecting molten sulfur into a suitable liquid-hydrocarbon slurry vessel containing a carrier ranging in viscosity from gasoline to a crude oil, removing the hot sulfur slurry from the slurry vessel and adding or injecting a vaporizable low-molecular weight hydrocarbon, such as an aliphatic hydrocarbon of less than 6 carbon atoms, e.g., propane, butane and pentane and mixtures thereof which on evaporation in a flasher vessel cools the sulfur-liquid hydrocarbon slurry to a temperature required for pipeline injection and transportation. After cooling the hot sulfur slurry by addition thereto of a $C_6$ or lower hydrocarbon and flash evaporation of the lower hydrocarbon from the slurry, the sulfur slurry can be concentrated further by sedimentation or other means and can finally contain from 20–75% by volume of sulfur stably dispersed in the liquid hydrocarbon carrier which can range in viscosity from a light petroleum fraction such as liquefied petroleum gas (LPG), gasoline, kerosene, fuel oil, lube oil, petroleum distillates, condensates, crude oil and mixtures thereof. Preferred carriers are liquid petroleum containing at least 10% or higher of aromatics, preferably about 15–80% aromatic enriched kerosene or oil condensate fractions or crude oil containing 15–30% aromatics which include mono- and polyaromatic hydrocarbons.

The addition of volatile low molecular hydrocarbons such as butane to a hot sulfur liquid hydrocarbon slurry for evaporative cooling purposes must be done after the sulfur particles have solidified. Cooling of the slurry will ordinarily require the addition of from about 5% to 20% volatilizable hydrocarbons. Addition of said volatile hydrocarbons, e.g., butane, to a hot sulfur-liquid hydrocarbon slurry in the chamber where the molten sulfur is being injected produces an adverse effect on shape, strength and size of sulfur particles required for pipeline transportation. Thus, the addition of 5% or more of a volatile hydrocarbon to the chamber in which the liquid sulfur is being injected generally produces large, irregular sulfur particles which are weak and susceptible to attrition and the like. On the other hand it has been found that evaporative cooling of hot sulfur-liquid hydrocarbon slurry by adding butane or the like in a subsequent zone effectively cools the slurry and no undesirable effects are produced with respect to size, shape and strength of the sulfur particles.

The volatile hydrocarbon, e.g., butane, can be added to, admixed with or injected into any suitable hot sulfur slurry in which the carrier is a liquid hydrocarbon, e.g., crude oil, fractions thereof and their mixtures. After it has been added to the hot sulfur slurry for evaporative cooling, the butane can be removed from the hot slurry by pressure adjustments before injection of the slurry into a pipeline for transportation to a terminal station without the danger of sulfur attrition or sulfur plugging of the line. The evaporated hydrocarbon (butane) can be recovered by compression and condensatiion and recycled and used again if desired.

BRIEF DESCRIPTION OF THE DRAWING

The drawing illustrates the process of this invention.

Into spray or slurry vessel 10 is introduced oil via line 11 into which line can be also introduced additives via line 21 and the oil or oil-additive mixture is passed through pump 13 into said vessel 10. Into vessel 10 is also introduced molten sulfur via line 12 and heat exchanger 27. The vessel 10 into which the oil and molten sulfur is injected can contain a stirrer (not shown) so as to aid in mixing the sulfur and oil in vessel 10. A volatile hydrocarbon, e.g., butane, via line 16 can be introduced into the oil line 14 through which is pumped via pump 15 the hot sulfur slurry, now also containing butane, into flasher 24. In the flasher 24 the volatile hydrocarbon (butane) is flashed off and removed via valved line 17 or sent to the compressor-condensor 26 and recycled via line 16 to line 14. Thus, sulfur slurry is removed from vessel 10 via line 14, the volatile hydrocarbon (butane) is introduced therein via line 16 and the entire mixture is pumped through pump 15 into a flasher 24 wherein the volatile hydrocarbon (butane) is flashed off and removed via valved line 17 or compressed and condensed in 26 and recycled into line 14. The sulfur-oil slurry can be removed from the flasher via valved line 22 or the sulfur-oil slurry can be thickened by sending it via line 18 into a settler 25 wherein a thickened sulfur-oil slurry is removed via line 23 for pipeline injection and transportation. The excess oil can be removed via lines 19 and 20 or recycled via lines 19 and 11 and pumped (13) into the slurry vessel 10. The slurries recovered from lines 22 and/or 23 are cool enough for pipeline transportation so as to obviate the dangers of injecting hot slurries into a pipeline as described above.

PREFERRED EMBODIMENT OF THE INVENTION

A preferred method for preparing a sulfur oil slurry for pipeline transportation comprises spraying molten sulfur (5–30% by volume) via line 12 into vessel 10 which contains crude oil added thereto via lines 11 and 19 and additives added thereto via line 21, if desired, which can include asphaltenes or natural petroleum products containing polar compounds. Butane is introduced into line 14 via lines 16 and 17 in an amount of between 5 % and 20% wherein it is admixed with the hot sulfur-oil slurry. The hot slurry is pumped via line 14 and pump 15 into flasher 24 where part or essentially all of the butane is flashed off and removed via lines 19 and 20, and if recycled, compressed and condensed in 26, reinjected into the slurry line 14. The sulfur-oil slurry is removed from the flasher via line 22 at a temperature of around 70–120° F. Instead of using only one flasher 24 as shown in the drawing, a series of flashers can be used and the slurry can be cooled in stages. To obtain a more concentrated sulfur slurry the sulfur-oil slurry line 22 can be closed and the slurry can be sent to settler 25 via line 18 where the slurry is allowed to settle, leaving an oil phase which is removed via line 19 and line 20, or the oil can be recycled into slurry vessel 10 via lines 19 and 11. The thickened sulfur slurry is removed from settler 25 via line 23 and can have a sulfur concentration above 30% and preferably between about 35 and 55% by volume which can be pumped directly into a pipeline for transportation to a terminal station.

During the preparation of the sulfur-oil slurry in vessel 10, sulfur-slurry improvement additives can be introduced via line 21 in amounts of from 0.1% to 10% into the oil which aid in formation of spherical sulfur particles generally within the range of 1 to 800 microns and which impart to the slurry other benefits. The additives best suited for this purpose include asphaltenic additives which can be obtained from unrefined or refined crude oil and fractions thereof. By unrefined crude oil is meant any crude oil which has not been processed in a refinery. Thus, a crude oil may be used as it is removed from the ground, or it may be first processed in field units such as oil-water separators, degasers, etc. Although just how the asphaltenes function in the slurry mixture is not understood, it has been found that the asphaltenes prevent sulfur agglomeration, sticking and aid in the formation of spherical sulfur particles having dimensions of from 1 to 800 microns and preferably between 20 and 300 microns.

The asphaltenes can be recovered from petroleum stocks by any suitable means such as described in the Journal of the Institute of Petroleum, February 1968, pages 50–53 and April 1968, pages 107–114 or as described in U.S. Pats. 3,206,388; 3,228,870; 3,153,623; 2,729,589; 3,368,876; 3,364,138; 3,206,388 and 3,275,076. The latter two base materials can be used per se as the asphaltene additive and carrier for the slurry. In other words, high asphaltenic crudes or fractions thereof containing at least 1% asphaltenes can be used both as the carrier and additive for the sulfur slurry. The asphaltenes, asphaltogenic acids and carboids and their method of recovery and separation from crudes and fractions thereof is also fully described in Chapter 9 of Sachanen's book on "The Chemical Constituents of Petroleum" and includes petroleum resins, asphaltenes, asphaltogenic acids and their derivatives. Also, the asphaltenic materials described in U.S. Pats. 2,275,076; 3,284,340 or 3,336,146 can be used and they can be separated from petroleum by methods described in U.S. Pats. 3,364,138 and 3,368,876.

Instead of asphaltenes, natural surfactant components present in crude oil can be used. The natural surfactants present in crude oil include the natural polar-containing constituents present in crude oil such as the nitrogen-, oxygen- and sulfur-containing materials and active hydrocarbons possessing surfactant properties and the materials can be added to the slurry of sulfur and liquid petroleum as described prior to or during the making of the slurry or these active surfactant materials can be injected when necessary in various places along the pipeline where indications are that the slurry might cause sulfur agglomeration, deposition, sticking or plugging of the line. Any plugging detection means known in the art can be used for this purpose. It has been noted that by adding or injecting into a slurry of the sulfur and liquid petroleum in which the sulfur content of the slurry can vary from about 5% to about 55% by volume, e.g., kerosene or oil condensate or crude oil, during or after the slurry preparation of from about 0.1 to 10% of an active surfactant derived from crude oil, that these active surfactant materials not only prevent plugging of pipelines transporting said slurry but also preventing agglomeration of sulfur, sticking during the slurry preparation and deposition of sulfur on the walls of the pipelines and improves flow of the slurry and reduces pumping costs.

The preferred additive is asphaltene and it should be added to the oil first and the molten sulfur injected thereafter.

Oils, preferably crude oils rich in asphaltenes, can be used per se in making the sulfur slurry. Generally, the liquid petroleum carrier for the sulfur can be one ranging in viscosity from a light petroleum fraction such as liquefied petroleum gas (LPG), gasoline, kerosene, fuel oil, lube oil, petroleum distillates, condensates, crude oil and mixtures thereof. Preferred are liquid petroleum containing at least 10% or higher of aromatics, preferably 15–80% aromatic enriched kerosene or oil condensate fractions or crude oil containing 15–30% aromatics which include mono- and polyaromatic hydrocarbons. A typical crude suitable for making the sulfur slurry has the following properties shown in Table A.

Table B gives the asphaltene contents of oils found suitable for sulfur slurry making and Table 1 sets forth the conditions for making sulfur oil slurries in accordance with the process of the present invention.

TABLE A

Properties of a typical suitable crude oil

| | |
|---|---|
| Gravity, API° | 38.7 |
| Viscosity, cs.: | |
| 60° F. | 6.83 |
| 100° F. | 4.17 |
| Pour point, ° F. | +15 |
| Acidity, meq./100 g. | 0.35 |
| Asphaltenes, percent w.: | |
| Isopentane insolubles | 1.61 |
| Benzene insolubles | 0.04 |
| Sulfur, percent w. | 0.66 |

TABLE B

Asphaltene content of fresh and recovered recycle carriers

| | Asphaltenes, percent w.[a] |
|---|---|
| Medicine river (MR) | 3.92 |
| Innisfail (I) | 0.32 |
| 8:6 blend MR/I, v./v. | 2.19 |
| Recycle [b] 8:6 MR/I blend | 2.22 |
| Interprovincial mix—Regina | 1.30 |
| Recycle interprovincial mix | 1.21 |

[a] Determined by precipitation with 10 vol. isopentane/vol. oil followed by centrifugation, decantation, washing with the same amount of isopentane, and drying in a vacuum oven in the centrifuge tube (Delaval Gyrotester).
[b] Oils separated from sulfur slurries by centrifugation at 12,000 G.

TABLE 1.—SULFUR SLURRY PREPARATION, MOLTEN SULFUR SPRAYED INTO CRUDE OIL
[Evaporative cooling with added butane. Mixing vessel: 5-gal autoclave, 10″ ID, 4-bladed turbine impeller, 680 r.p.m. Crude Oil: Rangeland-type crude.]

| | Run No. | | | | | | |
|---|---|---|---|---|---|---|---|
| | 1 | 2 | 3 | 4 | 5 | 6 | 8 |
| Oil rate, lb./hr[d] | 158 | 155 | 174 | 171 | 166 | 164 | 125 |
| Sulfur rate, lb./hr | 158 | 157 | 150 | 153 | 136 | 96 | 93 |
| Sulfur nozzle temperature,° C. | 150 | 151 | 151 | 150 | 151 | 149 | 149 |
| Butane rate, lb./hr | 25 | 29 | 29 | 29 | 28 | 26 | 25 |
| Mixing vessel pressure, p.s.i.g. | 24 | 24 | 23 | 24 | 25 | 25 | 24 |
| Slurry residence time, min. | 6.8 | 6.9 | 6.0 | 6.0 | 6.7 | 7.3 | 8.8 |
| Slurry density, g./ml.[a], [c] | 1.19 | 1.12 | 1.16 | 1.17 | 1.14 | 1.07 | 1.11 |
| Slurry concentration, percent v. S[a], [c]. | 29 | 29 | 26 | 27 | 25 | 19 | 23 |
| Weight-median particle size, $D^{50}$, $\mu$[b]. | 160 | 125 | 150 | 145 | 200 | 330 | 360 |
| Finer than 325 mesh, percent w. | 3.8 | 16 | 15 | 13 | 7.5 | 3.5 | 3.6 |

[a] Calculated from feed rates.
[b] Determined from wet screen analysis.
[c] Assuming all added butane weathered off.
[d] Interprovincial Mix (IPM) crude oil.

Sulfur slurries prepared by the method of the present invention can be transported through pipelines over great distances without the danger of sulfur deposition, agglomeration, sticking or plugging of the pipelines.

At the terminal end of the line the sulfur can be removed from the liquid hydrocarbon by suitable means such as described in U.S. Pat. 2,809,885 or as described in the copending patent application Ser. No. 684,507, filed Nov. 20, 1967 which comprises treating oil contaminated sulfur with an aqueous solution containing a mixture of alkali hydrosulfide and corresponding hydroxide, e.g., ammonium hydrosulfide and ammonium hydroxide or by other suitable means such as sulfur can be recovered from the oil slurry by filtration of molten sulfur and liquid-liquid extraction with a hydrocarbon solvent containing 10–50% aromatic. Thus, at the receiving terminal the sulfur slurry can be filtered and washed. The recovered sulfur is then melted and purified by liquid-liquid extraction with an aromatic hydrocarbon such as cumene. Also, if desired, the filtered sulfur can be steam stripped to recover bright yellow sulfur.

The foregoing description of the invention is merely intended to be explanatory thereof. Various changes in the details of the described method may be made within the scope of the appended claims without departing from the spirit of the invention.

We claim as our invention:
1. A method of transporting cooled sulfur slurries through a pipeline to a terminal station comprising:
 (a) injecting molten sulfur into a liquid petroleum carrier having a viscosity above liquefied petroleum gas to form a sulfur slurry containing at least 10% sulfur by volume;
 (b) adding to the hot sulfur slurry (a) a volatilizable low molecular weight hydrocarbon of less than 6 carbon atoms;
 (c) conducting the hot sulfur slurry to a flasher vessel where at least part of the low-molecular hydrocarbon is flash-evaporated to cool the hot sulfur slurry; and
 (d) injecting the cooled sulfur slurry into a pipeline.
2. The method of claim 1 wherein the carrier in (a) is a liquid petroleum selected from the group consisting of petroleum distillates, petroleum condensates, crude oil and mixtures thereof to which is added a small amount of a surfactant naturally present in crude oil.
3. The method of claim 2 wherein the carrier in (a) is a crude oil and the surfactant is an asphaltenic petroleum fraction.
4. The method of claim 1 wherein the carrier (a) is a crude oil containing asphaltenes, and the evaporating cooling liquid (b) is butane, and the thickened sulfur slurry of (c) contains from 15 to 50% sulfur by volume.
5. The method of claim 4 wherein the thickened cooled sulfur-asphaltene-containing crude oil slurry is essentially free of butane.

6. The method of claim 2 wherein the carrier in (a) is a petroleum condensate and the surfactant is an asphaltenic petroleum fraction.

7. The method of claim 2 wherein the carrier in (a) is a petroleum distillate and the surfactant is an asphaltenic petroleum fraction.

References Cited

UNITED STATES PATENTS

| | | | |
|---|---|---|---|
| 2,798,772 | 7/1957 | Redcay | 302—14 |
| 2,917,345 | 12/1959 | Phillips Jr. et al. | 302—14 |
| 2,947,578 | 8/1960 | Corneil et al. | 302—14 |
| 3,368,876 | 2/1968 | Bailey Jr. | 302—14 |
| 3,432,209 | 3/1969 | Scott | 302—66 |
| 3,443,837 | 5/1969 | Meyer et al. | 302—14 |
| 3,476,441 | 11/1969 | Elliott | 302—66 |

ANDRES H. NIELSEN, Primary Examiner

U.S. Cl. X.R.

302—14